UNITED STATES PATENT OFFICE.

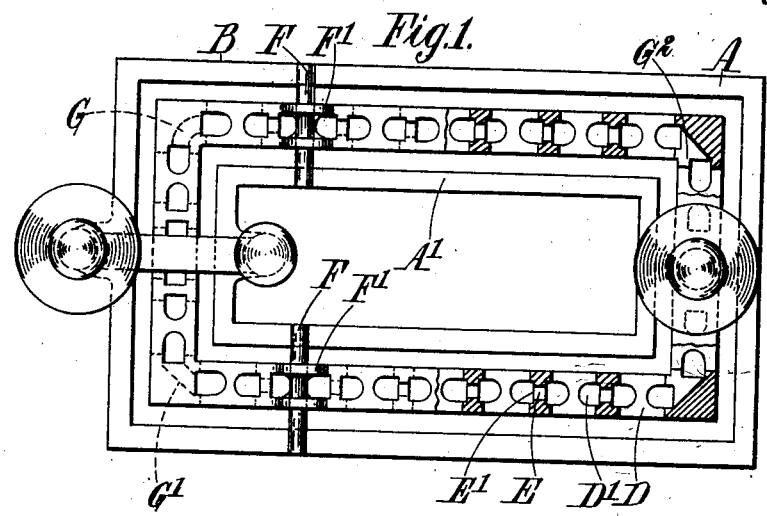
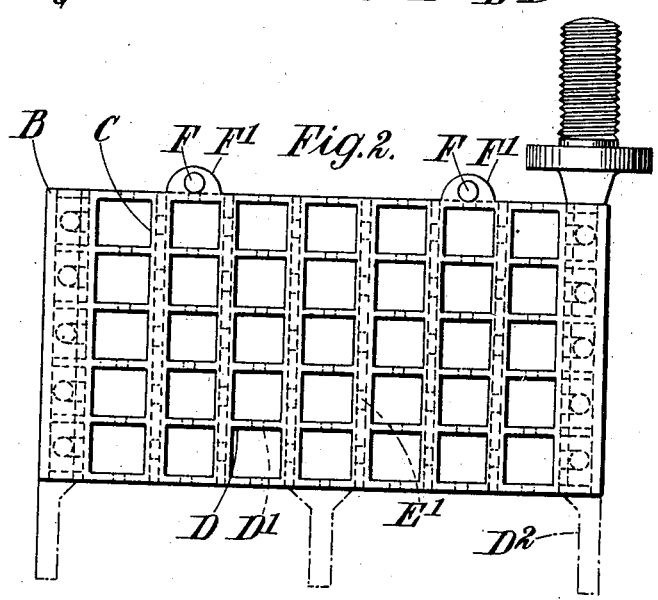
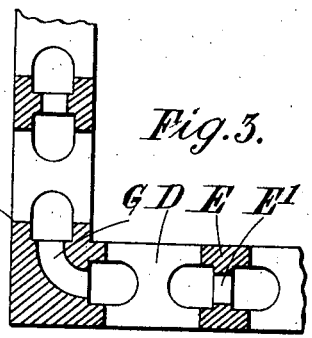

SIGMUND WILLNER, OF LONDON, ENGLAND, ASSIGNOR TO WILLIAM DEDERICH, OF LONDON, ENGLAND.

ACCUMULATOR ELECTRODE-GRID.

1,347,770.    Specification of Letters Patent.    Patented July 27, 1920.

Application filed September 4, 1918. Serial No. 252,629.

*To all whom it may concern:*

Be it known that I, SIGMUND WILLNER, residing in London, England, have invented certain new and useful Improvements in Accumulator Electrode-Grids, of which the following is a specification.

This invention relates to accumulator electrode-grids of the kind which presents open spaces, commonly rectangular, to receive paste or other active material, which spaces are arranged in two sets of intersecting rows, the spaces in one row being separated from those in the adjacent rows of the same set by portions of the grid which will hereinafter be referred to as "bars". The grid thus is formed of, or comprises, two series of "bars", such that the members of one series intersect those of the other. The said spaces are commonly arranged to constitute vertical rows and horizontal rows at right-angles to one another, in which upright "bars" separate the vertical rows, and horizontal "bars" separate the horizontal rows from one another.

Heretofore it has not been regarded as necessary to afford physical continuity between the active material in one space and that in an adjacent space, but the provision of electrical continuity by contact between the active material and the "bars" has been regarded as sufficient. It has, however, been recognized as desirable to key the paste securely in the spaces and incidentally this has in some cases afforded a certain measure of physical continuity between the paste in one space and that in the spaces above and below it. It is difficult to provide continuity throughout the mass of the paste, but the present invention is the result of experiments which prove that the provision of such continuity is advantageous and that it can be obtained without such difficulty as would make it not worth the obtaining. The present invention provides the said physical continuity and is directed mainly to the production of grids that are to be pasted, but is not limited thereto, since by suitably proportioning the spaces and "forming" active material upon the "bars", the spaces may be substantially filled with active material having physical continuity throughout.

The present invention provides an electrode-grid of the kind described for batteries, wherein the "bars" of both series are perforated to give physical continuity in both directions to the active material.

Preferably the grid comprises an upright series of "bars", the members of which are of I-shape in transverse section, or are otherwise grooved on their inner sides, and are provided with perforations piercing the web at the bottom of the said grooves.

In order to utilize to the best advantage the horizontal area occupied by a battery, this invention provides grids of the kind just above described, constructed as rectangular shells so dimensioned that one shell may be nested within another providing a series of concentric shells, each of which is rectangular.

This invention is now described by reference to the accompanying drawings which illustrate one construction of grid embodying this invention.

In the drawings—

Figure 1 is a plan of an accumulator having one positive and two negative elements, part of the positive element being in section, Fig. 2 is an elevation of the positive element, and Fig. 3 is a detail view to a larger scale than that of Figs. 1 and 2 of a portion of the grid.

The precise nature of my invention will be best understood by reference to the accompanying drawings, it being premised, however, that various changes may be made in the details of construction and general arrangement of the parts without departing from the spirit and scope of my invention, as defined in the appended claims.

In the drawings the reference characters A, A', and B designate three grids of rectangular form nested within each other. The central grid B constitutes the positive electrodes while the inner and outer grids A and A' constitute the negative electrodes.

In the drawings I have merely illustrated in detail the construction of the positive electrode, but if desired the negative electrodes may be made in the same manner as the positive electrodes, or in any desired form.

The positive electrode B is of rectangular form and comprises four walls connected to each other at their junctions by means of a vertical post, while each of these four walls are formed of upright bars C, which are of general I or H shape in transverse section and are connected to each other by a plurality of horizontal bars D of rectangular cross section and of somewhat lighter construction than the bars C. The web E of each of the bars C is provided with one or more perforations E' which form communicating openings between adjacent spaces in the same horizontal row, which spaces are bounded by the bars C and D. The bars D are also provided with openings between the bars C which form communicating openings between adjacent vertical spaces bounded by the bars C and D.

These perforations in each case are preferably oval or other elongated shape so as to give a greater area to the perforations than would be afforded by a circle or a square, and yet so as to leave sufficient material along the edges of the bars to form adequate support for the structure.

The lower ends of the upright bars of the two negative grids are extended a considerable distance below the lowest horizontal bar of the grid in order to leave sufficient room for the accumulation of sediment below the electrodes. The positive grid or electrode B does preferably not extend below the lowest horizontal bar of the negative electrodes, but is supported at its upper end by glass or other insulating rods F which extend through openings in lugs F' on the positive electrode, and are supported on the negative electrodes. This arrangement allows for a free expansion and contraction of the positive electrode or grid. If desired, however, the positive grid or electrode may have legs $D^2$ which extend to the bottom for supporting the electrodes, as clearly shown in chain lines in Fig. 2.

The posts at the junction of the walls of the grid E are provided with openings which connect adjacent spaces in different walls which lie in the same horizontal plane. These spaces may be either of curved form as shown in G in Figs. 1 and 3, angular form as shown in G' in Fig. 1, or they may be merely slots as indicated at $G^2$ in Fig. 1.

I prefer, however, to have these connecting spaces as shown at $G^2$, as these openings can more readily be formed, as it is not necessary to provide cores which are hard to remove.

The spaces between the bars C and D, as well as the openings, E', D' and the openings or slots G' and $G^2$ are filled with the usual plastic material. When so filled there is a physical continuity of the active material in all directions.

If desired suitable separators may be inserted, and the number of electrodes or grids may be varied from that shown in the drawings, while the terminals may be arranged in any desired or convenient manner for connecting the negative grids to each other as well as the positive grids.

It will also be understood that the cross section of the bars may be varied from that shown in the drawings, as clearly called for in my broadest claim.

The advantages of my invention result from the provision of a grid having a plurality of spaces which are to be filled with active material, and in which the separating walls between the spaces are provided with openings through which the active material is adapted to extend, so as to provide a physical continuity of the active material. A further advantage results from the provision of a grid of rectangular form and in which each of the walls is provided with a plurality of interconnected spaces and in which the adjacent spaces of adjacent walls are interconnected, so as to provide a grid in which there is a physical continuity of the acting material in different directions.

I claim:

1. A grid for an electrode having two sets of bars intersecting each other to form individual spaces between two bars of each set and in the plane of the bars, one set of bars having perforations therethrough forming communicating openings between adjacent individual spaces in the same row, substantially as described.

2. A grid for an electrode having two sets of bars intersecting each other to form vertical and horizontal rows of spaces between said bars, both sets of bars having perforations therethrough forming communicating openings between adjacent spaces in both rows, substantially as described.

3. A grid for an electrode having one set of parallel bars which are provided with a web and flanges at each end of the web, a second set of parallel bars intersecting the other set of bars, there being active material spaces formed between the bars of both sets, there being perforations through the webs of the one set of bars to form communicating openings between adjacent spaces in the same row, through which the active material which is filled in the spaces extends, substantially as described.

4. A grid for an electrode having one set of parallel bars which are provided with a web and flanges at each end of the web, a second set of parallel bars intersecting the other set of bars, there being active material spaces formed between the bars of both sets, there being perforations through the webs of the one set of bars to form communicating openings between adjacent spaces in the same row, through which the active material which is filled in the spaces extends, there also being perforations through the other bars to form communicating openings between adjacent spaces in the other row of spaces, substantially as described.

5. A grid for an electrode of rectangular form, each of the walls being built up of parallel vertical and horizontal bars lying in substantially the same plane, to form vertical and horizontal rows of individual spaces between the bars, there being communicating openings through said bars between individual spaces, substantially as described.

6. A grid for an electrode of rectangular form, each of the walls of the grid being formed of parallel bars having web and flanges at the ends of the web, and parallel intersecting bars to form vertical and horizontal rows of spaces, there being perforations through the webs of the one set of bars which form communicating openings between adjacent spaces in the same plane, there also being perforations through the other bars to form communicating openings between adjacent spaces in the same planes, substantially as described.

7. An accumulator having a plurality of grids nested within each other, the four walls of one grid being built up of a plurality of vertical and horizontal bars, to form vertical and horizontal rows of individual spaces, there being perforations through the bars to form communicating openings between adjacent individual spaces, substantially as described.

8. An accumulator having a plurality of grids nested within each other, the four walls of one grid being built up of a plurality of vertical and horizontal bars, to form vertical and horizontal rows and spaces, there being perforations through the bars to form communicating openings between adjacent spaces, and means for supporting one of the grids on the other grids, substantially as described.

9. An accumulator having a plurality of grids nested within each other, the four walls of one grid being built up of a plurality of vertical and horizontal bars, to form vertical and horizontal rows and spaces, there being perforations through the bars to form communicating openings between adjacent spaces, and upwardly extending lugs on the top of said grid, and insulating members extending through openings in said lugs and supported on the other grids, substantially as described.

In testimony whereof I affix my signature.

SIGMUND WILLNER.